Harrison T. Buff's Rotary Steam Engine
74662
PATENTED
FEB 18 1868
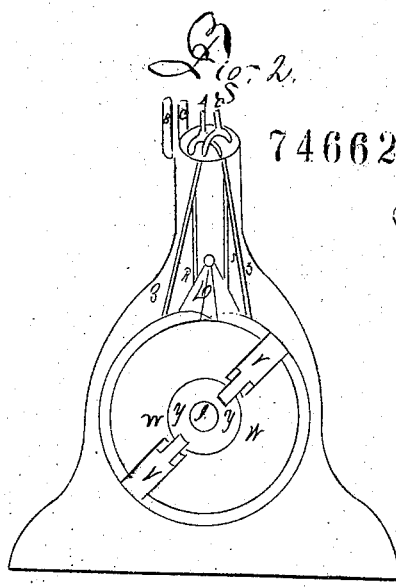
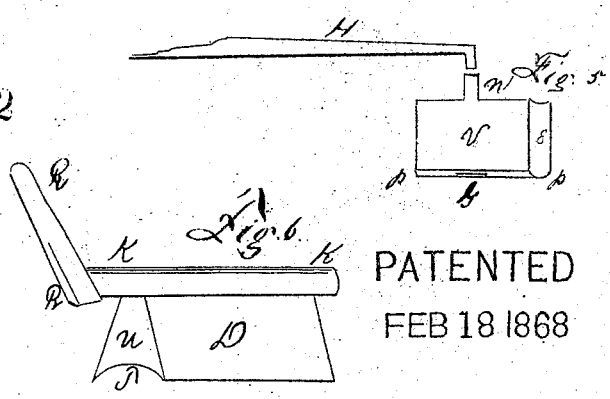
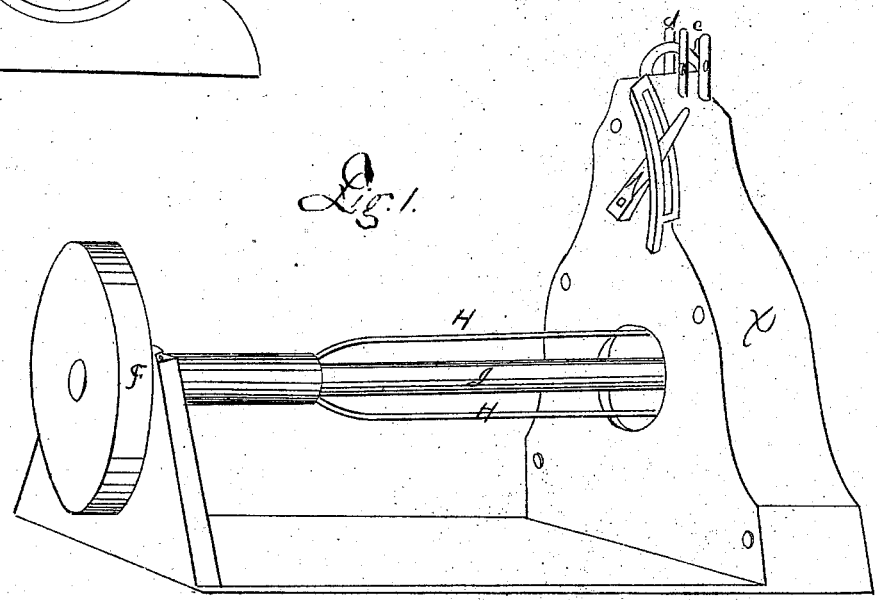
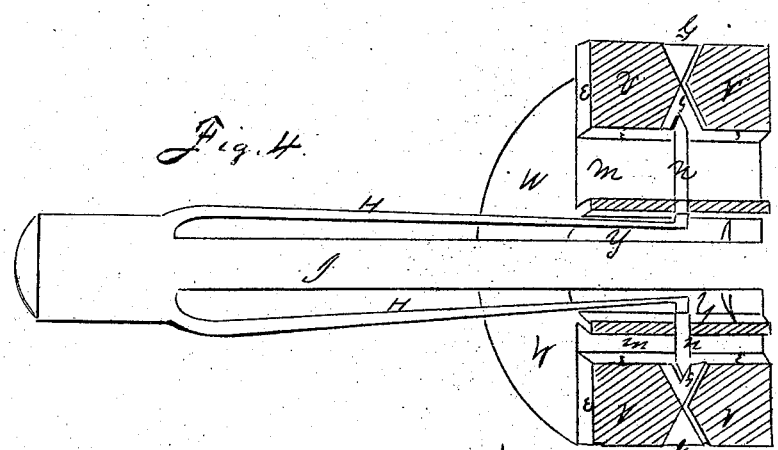
Attest
Chas. Werbe
Charles Seery
Inventor
Harrison T. Buff

UNITED STATES PATENT OFFICE.

HARRISON T. BUFF, OF FRANKLIN, INDIANA.

IMPROVEMENT IN ROTARY STEAM-ENGINES.

Specification forming part of Letters Patent No. 74,662, dated February 18, 1868.

*To all whom it may concern:*

Be it known that I, HARRISON T. BUFF, of Franklin, in the county of Johnson, and in the State of Indiana, have invented an Improved Rotary Steam and Gas Engine; and I do hereby declare that the following is a full, clear, and exact description thereof, reference being had to the accompanying drawings, and letters and figures of reference marked thereon, in which—

Figure 1 is a perspective view, and showing the machine in combination ready for motion.

Fig. 1. A, steam-pipe; C, escape-pipe. O and B are valves, which regulate the admission and emission of steam to and from the cylinder; X, the steam chest or cylinder, (both being one;) I, the main shaft, to which is attached the revolving piston-head. H and H are springs for adjustment of the valves in piston-head; F, a drum; R, a bar to work the triangular valve in steam chest or cylinder.

Fig. 2. This represents an inside view of the cylinder or steam chest, with piston-head W W; self-adjusting valves V and V'; triangular self-adjusting valve D, which regulates the action of steam or power upon the piston-head W W. R and I are steam-pipes, for admission of steam to cylinder. O and Z are escape-pipes; A, steam-pipe; C, escape-pipe. O and B are valves to regulate the admission of steam, and emission of the same; Y Y, excavation in rotary head, to allow the self-adjusting of valves V and V'; I, section of main shaft.

Fig. 4 is the side view of rotary head. V and V', self-adjusting valves, worked by springs H and H. E E represent a groove in the end of self-adjusting valves V and V'; M M, grooves in rotary head, to permit the moving of valves V V'; N N, the points of contact between the springs and valves, which are in the center of said valves V and V'; I, main shaft, around which the rotary head is securely fastened.

Fig. 5, a side view of self-adjusting valve V; G, an opening in valve, to allow the passage of steam through said valve in openings G G, to equalize the pressure of steam upon the same. P shows the oval surface of valve, to fit steam-tight on inner surface of steam chest or cylinder. E is the groove in end of valve, to permit the escape of steam while passing under triangular valve D, in Fig. 2. E' is a groove on under side of valve, to permit the steam to pass from the opening G G to groove E; H and H, the springs, attached at one end to main shaft, by which the valves are worked. N is a point of contact between valve and spring.

Fig. 6 shows the triangular and self-adjusting valve D, as in Fig. 2. U, end view; D, side view; T, groove to fit the outer face of rotary head W W, as in Fig. 2. At T is a small bevel or groove on the edge of face U, to permit the steam to pass back, for escape as valves V and V' are passing under the triangular valve D, as in Fig. 2. R is an arm or lever, to change valve D when reverse motion is wanted.

The intended operation is thus briefly described by looking at Fig. 2: The valves V and V' are of even depth or length of the rotary head W W, coming out upon a plane with the face of the cylinder, as seen in Fig. 2, so that the head and sides of the cylinder will fit steam-tight, and touch when the machine is ready for motion. The steam passes into the cylinder by pipe S striking the surface of valve D, causing the points of same to bear upon the rotary head W W. The steam bears upon the side of valve V', which forces it around the cylinder to a point opposite valve D, when the other valve, V, is pressed even with the surface or point of valve D, and at which point, on passing, flies up, as V' now is, then receives the force of steam, and, in turn, drives around until V' has passed the point in the circle where the pipe Q is found, at which point the steam which drove V begins to exhaust.

The importance of the opening G in the valves V and V' is readily seen by the diagram 2. When the valve V passes the point of D, at which place it must spring up and adjust itself, the force of the steam upon the surface P P of V' would prevent the valve from springing up, thus defeat the purpose; but, when half or little more than half way past the point of D, the steam has passed through the openings G G, under the valve, and presses upon it the same from all points, thus allowing the springs H and H, in Fig. 4, to force the valve V' up, so as to secure the force of steam upon its side.

The grooves made in the end of valves V and V' are for the purpose of escape of steam from under the valve when being depressed by passing under the valve D, as represented by E in Fig. 5. Also, bevel at T, in Fig. 6, is for the passage of steam backward for escape as the valves V and V' are nearing the lower point of D. The same explanation is applicable when there is a reverse motion wanted, by letting in the steam at pipe R. The escape is at the pipe Z.

What I claim, and desire to secure by Letters Patent, is—

1. The self-adjusting valves V and V', with their grooves, arranged substantially as herein set forth.

2. The arrangements of the rotary head, valves, and springs, as herein set forth.

3. The arrangement of the steam and escape pipes, as herein described.

HARRISON T. BUFF.

Witnesses:
    NATHANIEL G. BUFF,
    JOHN WILSON.